(12) United States Patent
Endo et al.

(10) Patent No.: US 11,809,187 B2
(45) Date of Patent: Nov. 7, 2023

(54) MOBILE OBJECT, CONTROL METHOD OF MOBILE OBJECT, CONTROL DEVICE AND PROGRAM

(71) Applicant: TOYOTA JIDOSHA KABUSHIKI KAISHA, Toyota (JP)

(72) Inventors: Masato Endo, Chofu (JP); Katsuhiko Yourou, Toyota (JP); Shunji Tateishi, Kasugai (JP); Nobukatsu Fujishita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 16/796,180

(22) Filed: Feb. 20, 2020

(65) Prior Publication Data
US 2020/0285238 A1 Sep. 10, 2020

(30) Foreign Application Priority Data
Mar. 5, 2019 (JP) .................................. 2019-039214

(51) Int. Cl.
*G05D 1/02* (2020.01)
*G05D 1/12* (2006.01)
*G05D 1/00* (2006.01)

(52) U.S. Cl.
CPC ........... *G05D 1/021* (2013.01); *G05D 1/0088* (2013.01); *G05D 1/12* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 10,150,448 | B2* | 12/2018 | Huennekens | G08B 21/00 |
| 2014/0292545 | A1* | 10/2014 | Nemoto | G08G 1/017 340/988 |
| 2016/0253642 | A1* | 9/2016 | Efird | G06Q 10/0835 705/34 |
| 2017/0080900 | A1 | 3/2017 | Huennekens et al. | |

(Continued)

FOREIGN PATENT DOCUMENTS

| | | |
|---|---|---|
| JP | 11-184521 A | 7/1999 |
| JP | 2010-30569 A | 2/2010 |

(Continued)

OTHER PUBLICATIONS

Partial Translation of Notification of Reason(s) for Refusal dated Jul. 11, 2022 from the Japanese Patent Office in Japanese Application No. 2019-039214.

(Continued)

*Primary Examiner* — Jelani A Smith
*Assistant Examiner* — Davin Seol
(74) *Attorney, Agent, or Firm* — Sughrue Mion, PLLC

(57) ABSTRACT

A control device controls a mobile object capable of traveling within a predetermined closed area, which allows a user to get on the mobile object at a first location within the predetermined closed area and to get off at a second location different from the first location. The control device controls the mobile object such that the mobile object travels to the first location when the mobile object remains in a state, for a predetermined period of time, in which no luggage is left in the mobile object.

7 Claims, 7 Drawing Sheets

(56) References Cited

U.S. PATENT DOCUMENTS

| | | | | |
|---|---|---|---|---|
| 2019/0079521 A1* | 3/2019 | Blum | ...... | A63G 25/00 |
| 2019/0391579 A1* | 12/2019 | Khurgin | ...... | B60R 25/24 |
| 2020/0043344 A1* | 2/2020 | Shimizu | ...... | G06Q 50/30 |
| 2020/0191582 A1* | 6/2020 | Urano | ...... | G06Q 10/02 |
| 2020/0241529 A1* | 7/2020 | Salter | ...... | B60Q 9/00 |
| 2020/0257312 A1* | 8/2020 | Suzuki | ...... | G08G 1/22 |

FOREIGN PATENT DOCUMENTS

| | | | |
|---|---|---|---|
| JP | 2011-159299 A | | 8/2011 |
| JP | 5131080 B2 | * | 1/2013 |
| JP | 2017-182301 A | | 10/2017 |
| JP | 2018-124974 A | | 8/2018 |
| JP | 2019-8432 A | | 1/2019 |

OTHER PUBLICATIONS

Rui Fukui et al., "Study on Travel of Ultrasmall Mobility in File by Vehicle Relative Motion Measurement Device Mounted at Joint", the 36th Annual Conference of the Robotics Society of Japan, 2018 (4 pages total).

* cited by examiner

MOBILE OBJECT, CONTROL METHOD OF MOBILE OBJECT, CONTROL DEVICE AND PROGRAM

INCORPORATION BY REFERENCE

The disclosure of Japanese Patent Application No. 2019-039214 filed on Mar. 5, 2019 including the specification, drawings and abstract is incorporated herein by reference in its entirety.

BACKGROUND

1. Technical Field

The present disclosure relates to a mobile object, a control method thereof, a control device and a program.

2. Description of Related Art

Various technologies relating to vehicles that can autonomously travel (autonomous vehicles) have been proposed. For example, an apparatus and a method have been proposed in recent years, in which, when an occupant drops off an autonomous vehicle, the autonomous vehicle is moved to a standby location by autonomous traveling, and a destination to travel to, from the standby location, is determined based on demand prediction information of the autonomous vehicle (see, for example, Japanese Unexamined Patent Application Publication No. 2018-124974 (JP 2018-124974 A)).

SUMMARY

In the conventional techniques, such as those described in JP 2018-124974 A, it is determined whether or not the user has dropped off the vehicle based on whether or not the user has gotten off the vehicle (whether or not the user has pressed a button for getting off the vehicle), whether or not the vehicle has stopped (whether or not the speed of the vehicle is zero), and the like, but a determination based on whether or not luggage is left in the vehicle has not been employed yet. Therefore, it may be erroneously determined that the user has dropped off the vehicle even when luggage is left in the vehicle.

The present disclosure is intended to provide a mobile object capable of determining whether or not a user has dropped off a vehicle based on whether or not luggage is left in the vehicle, considering the shortcoming stated above.

For achieving the objective of the present disclosure, a first aspect of the present disclosure is to provide a mobile object configured to autonomously travel within a predetermined closed area the mobile object allowing a user to get on the mobile object at a first location within the predetermined closed area, and to get off at a second location different from the first location, wherein the mobile object is configured to autonomously travel to the first location when the mobile object remains in a state, for a predetermined period of time, in which no luggage is left in the mobile object.

The mobile object, which allows the user to drop off the vehicle (that is, the user getting on at the first location can get off at the second location, which is different from the first location) within the predetermined closed space, is thus configured to determine that the user has dropped off the vehicle when the mobile object remains in a state, for a predetermined period of time, in which no luggage is left in the mobile object, whereby the mobile object can then autonomously travel to the first location. In other words, the mobile object can autonomously return to a platform (first location) by determining whether or not the user has dropped off the vehicle based on whether or not luggage is left in the vehicle. Therefore, it is possible to promote the use of the mobile object within the closed space.

A second aspect of the present disclosure is to provide a control device for controlling a mobile object configured to autonomously travel within a predetermined closed area, the mobile object allowing a user to get on the mobile object at a first location within the predetermined closed area and to get off at a second location, different from the first location, wherein the control device is configured to control the mobile object such that the mobile object travels to the first location when the mobile object remains in a state, for a predetermined period of time, in which no luggage is left in the mobile object.

A third aspect of the present disclosure is to provide a control method of controlling a mobile object configured to travel within a predetermined closed area, the mobile object allowing a user to get on the mobile object at a first location within the predetermined closed area, and to get off at a second location different from the first location, wherein the control method includes a step of controlling the mobile object such that the mobile object travels to the first location when the mobile object remains in a state, for a predetermined period of time, in which no luggage is left in the mobile object.

A fourth aspect of the present disclosure is to provide a program of controlling a mobile object configured to travel within a predetermined closed area, the mobile object allowing a user to get on the mobile object at a first location within the predetermined closed area, and to get off at a second location different from the first location, in which the program causes a computer to execute controlling the mobile object such that the mobile object travels to the first location when the mobile object remains in a state, for a predetermined period of time, in which no luggage is left in the mobile object.

With such a configuration and a method, it is possible to determine that the user has dropped off the vehicle in a case in which the mobile object, which allows the user to drop off the vehicle (that is, the user getting on at the first location can get off at the second location which is different from the first location) within the predetermined closed space, remains in a state, for a predetermined period of time, in which no luggage is left in the mobile object, and thereby controlling the mobile object to move to the first location. In other words, it is possible to return the mobile object to a platform (first location) by efficiently determining whether or not the user has dropped off the vehicle based on whether or not luggage is left in the vehicle. Therefore, it is possible to promote the use of the mobile object within the closed space.

In the control device, according to the second aspect of the present disclosure, a follow-up command signal for allowing the other mobile object to follow the mobile object may be generated when the mobile object is moved to the first location. Furthermore, the control device may control the mobile object to follow the other mobile object when a follow-up command signal for allowing the mobile object to follow the other mobile object is received.

With such a configuration, the control device can transmit a follow-up command signal to, for example, the other mobile object, which a user has also dropped off when the dropped-off mobile object is moved to the platform (first location). Moreover, the control device may control the mobile object to follow the other mobile object when receiving a follow-up command signal transmitted from the other mobile object. Therefore, it is possible to move several mobile objects (by, for example, linking together) together to the platform.

In the first to fourth aspects of the present disclosure, a specific location where the user needs to move via the mobile object can be adopted as the first location.

Consequently, when the user drops off the mobile object, it is possible to return the mobile object to the specific location (first location) where the user needs to move via the mobile object. Therefore, it is possible to prevent the mobile object from being left at a location where the user does not need to move via the mobile object, and to further promote the use of the mobile object.

According to the present disclosure, it is possible to provide a mobile object capable of determining whether or not a user has dropped off a vehicle based on whether or not luggage is left on the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, each embodiment of the present disclosure will be described with reference to drawings. The following embodiments are merely examples for illustrating the present disclosure, and the present disclosure is not limited to these embodiments. Furthermore, the same symbols will be assigned to the components which have the same or similar functions, and the same descriptions will be omitted.

First Embodiment

A mobile object 1 according to a first embodiment of the present disclosure will be described referring to FIGS. 1 to 4.

The mobile object 1 according to the present embodiment is capable of autonomously traveling within a predetermined closed area, and allows a user U (refer to FIG. 1) to get on at a first location within the predetermined closed area and to get off at a second location which is different from the first location. An example of the closed area is a predetermined area set in a park. A specific location where the user U needs to move via the mobile object 1 can be adopted as the first location. For example, the first location may be in the vicinity of a borderline between a place where the user U wants to walk without using the mobile object 1 (for example, an avenue of trees, a flat walkway, or a walkway with shelter from rain) and a place where the user U wants to move quickly using the mobile object 1 (for example, a place with harsh sunlight, an uphill walk, or a walkway without shelter from rain). A second location can be arbitrarily determined by the user U within the closed area.

Figure 1:
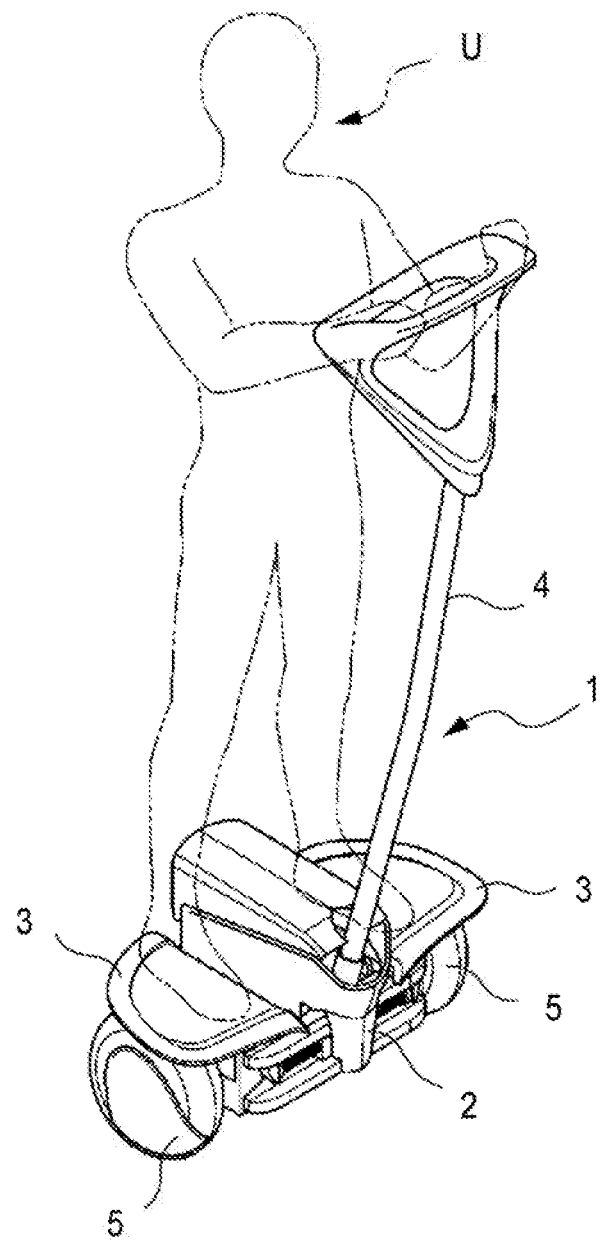
FIG. 1 is a perspective view illustrating an appearance of a mobile object according to a first embodiment of the present disclosure.

As shown in FIG. 1, the mobile object 1 includes a vehicle main body 2, a pair of left and right stepping parts 3 which are attached to the vehicle main body 2 and which the user U gets on, an operating handlebar 4 that is attached to the vehicle main body 2, is tiltable, and is gripped by the user U, and a pair of left and right driving wheels 5 which are rotatably attached to the vehicle main body 2. The mobile object 1 according to the present embodiment is configured as a coaxial two-wheeled vehicle in which each driving wheel 5 is coaxially arranged and which travels while maintaining an inverted state. It is also referred to as an inverted mobile object. The mobile object 1 moves the center of gravity of the user U back and forth, moves forwards and backwards by tilting each stepping part 3 of the vehicle main body 2 back and forth. The mobile object 1 also moves the center of gravity of the user U left and right, and turns left and right by tilting each stepping part 3 of the vehicle main body 2 left and right. Although the dimension of the mobile object 1 is not specifically limited, for example, it is desirable to be small enough to travel on a relatively narrow road.

Below the stepping part 3 of the mobile object 1, a luggage compartment unit (not shown), that can accommodate luggage of the user U, is provided. In order to expand the accommodation space of the luggage compartment unit, each stepping part 3 may be provided at a higher position than as shown in FIG. 1. Furthermore, a display unit such as a display may be provided on an upper portion of the operating handlebar 4.

Figure 2:
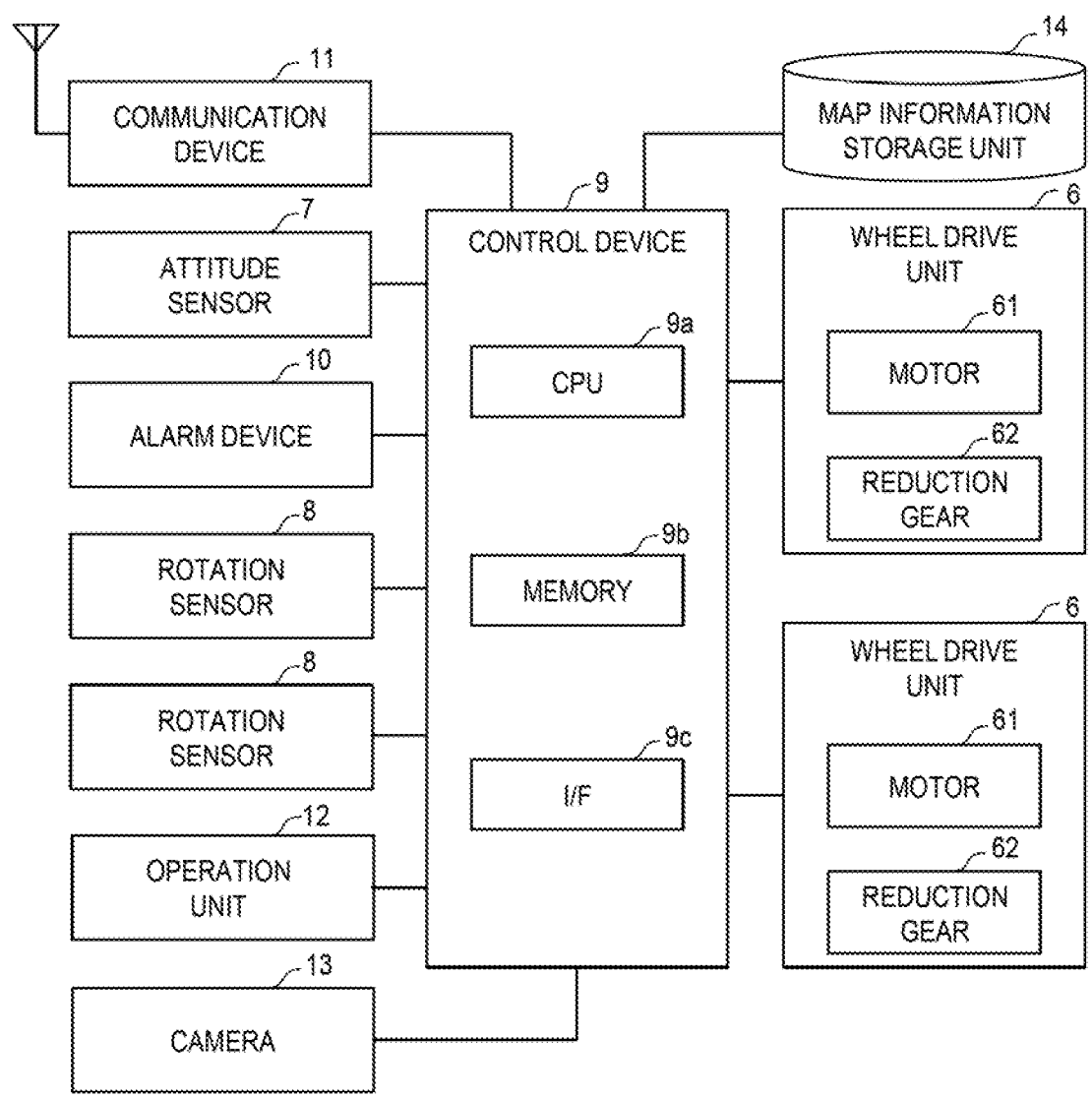
FIG. 2 is a block diagram illustrating a functional configuration of the mobile object according to the first embodiment of the present disclosure.

Furthermore, as shown in FIG. 2, the mobile object 1 includes a pair of wheel drive units 6 that drive each driving wheel 5, an attitude sensor 7 that detects an attitude of the vehicle main body 2, a pair of rotation sensors 8 that detect rotation information of each driving wheel 5, a control device 9 that controls each wheel drive unit 6, a battery (not shown) that supplies power to the wheel drive units 6 and control device 9, an alarm device 10, a communication device 11, an operation unit 12, a camera 13, a map information storage unit 14, and the like.

Each wheel drive unit 6 is built in the vehicle main body 2 and drives the pair of left and right driving wheels 5, respectively. Each wheel drive unit 6 can independently rotate and drive the pair of driving wheels 5. Each wheel drive unit 6 can be configured by, for example, a motor 61 and a reduction gear 62 connected with a rotation shaft of the motor 61 so that the power transmission is available.

The attitude sensor 7 is provided in the vehicle main body 2, and detects and outputs attitude information of the vehicle main body 2 and the operating handlebar 4. The attitude sensor 7 detects the attitude information when the mobile object 1 is traveling and is configured by, for example, a gyro sensor, an acceleration sensor, and the like. When the user U tilts the operating handlebar 4 forwards or backwards, each stepping part 3 tilts in the same direction. The attitude sensor 7 detects the attitude information as corresponding to the tilt. The attitude sensor 7 outputs the detected attitude information to the control device 9.

Each rotation sensor 8 is provided on, for example, each driving wheel 5, and detects the rotation information such as a rotation angle, a rotation angular velocity, or a rotation angle acceleration of each driving wheel 5. Each rotation sensor 8 is configured by, for example, a rotary encoder, a resolver, or the like. The rotation sensor 8 outputs the detected rotation information to the control device 9.

The control device 9 generates and outputs a control signal for driving and controlling each wheel drive unit 6 based on detected values output from various sensors mounted on the mobile object 1. For example, the control device 9 executes a predetermined computing process based on the attitude information output from the attitude sensor 7, the rotation information of each driving wheel 5 output from each rotation sensor 8, and the like, and outputs necessary control signals to each wheel drive unit 6. The control device 9 controls each wheel drive unit 6 to execute, for example, inversion control for maintaining the inverted state of the mobile object 1.

The control device 9, which generates a control signal for controlling each unit of the mobile object 1, includes a CPU (central processing unit) 9a that performs various computing processes and a memory 9b that stores various programs and various data, executed by the CPU 9a and an interface unit (I/F) 9c. The CPU 9a executes various computing processes, according to instructions included in various programs stored in the memory 9b, and controls each of the units. The memory 9b stores, for example, a computer program for executing various computing processes, a computer program for executing computing processes to control the wheel drive units 6 based on the operation unit 12, and a computer program for executing a computing process to autonomously control the wheel drive units 6 based on the information acquired from the communication device 11. The memory 9b can also include a cache memory such as an SRAM and a DRAM which temporarily stores data on the computing process performed by the CPU 9a. The CPU 9a, the memory 9b, and the interface unit 9c are connected to each other via a data bus or the like.

The alarm device 10 notifies an occupant in various ways according to an alarm signal from the control device 9. The alarm device 10 may be configured by, for example, a speaker that outputs sound, a lamp that flashes a warning light, a vibration device that vibrates, for example, the vehicle main body 2 or the operating handlebar 4, a display that shows a warning sign, and the like.

The communication device 11 includes, for example, a communication circuit for performing communication with a server device or a GPS satellite in accordance with a predetermined communication standard. The communication device 11 includes, for example, a transmitter circuit that transmits radio waves via an antenna, a receiver circuit that receives radio waves via the antenna, a switching circuit that switches a circuit connected to the antenna between a transmitter circuit and a receiver circuit, and the like. The communication device 11 can acquire the location information of the mobile object 1 from a GPS satellite, for example.

The operation unit 12 is an interface for the user U of the mobile object 1 to input information. The operation unit 12 may include an operation button or a touchscreen for the user U to perform an input operation. When the user U performs an operation, the operation unit 12 supplies a signal corresponding to the operation to the control device 9.

The camera 13 is configured by, for example, a CCD camera or an infrared camera. The camera 13 generates an image by capturing a road surface, and supplies the generated image to the control device 9. The camera 13 in the present embodiment is provided so as to capture the inside of the luggage compartment unit of the mobile object 1 in order to determine whether or not luggage is left in the mobile object 1.

The map information storage unit 14 stores map information. The map information includes, for example, information on roads, sidewalks or other places that can be traveled (including places for any vehicle and for pedestrians), and information on the interior of buildings. The map information of the closed area stored in the map information storage unit 14 includes information for specifying an area where the mobile object 1 can travel and an area where travel is not available (for example, stairs, off-roads, steep slopes or other places not suitable for travel). The control device 9 can determine a travel route in the area that can be traveled. Furthermore, the control device 9 can determine an optimal return route to home based on the map information stored in the map information storage unit 14. Moreover, the control device 9 may estimate how crowded the closed area is based on the map information stored in the map information storage unit 14 and information collected from other mobile objects and server devices, via the communication device 11, and notify the user U regarding how crowded the area is via the display of the alarm device 10.

Each functional unit of the control device 9 provided in the mobile object 1 according to the present embodiment will be described hereinbelow referring to FIG. 3.

Figure 3:
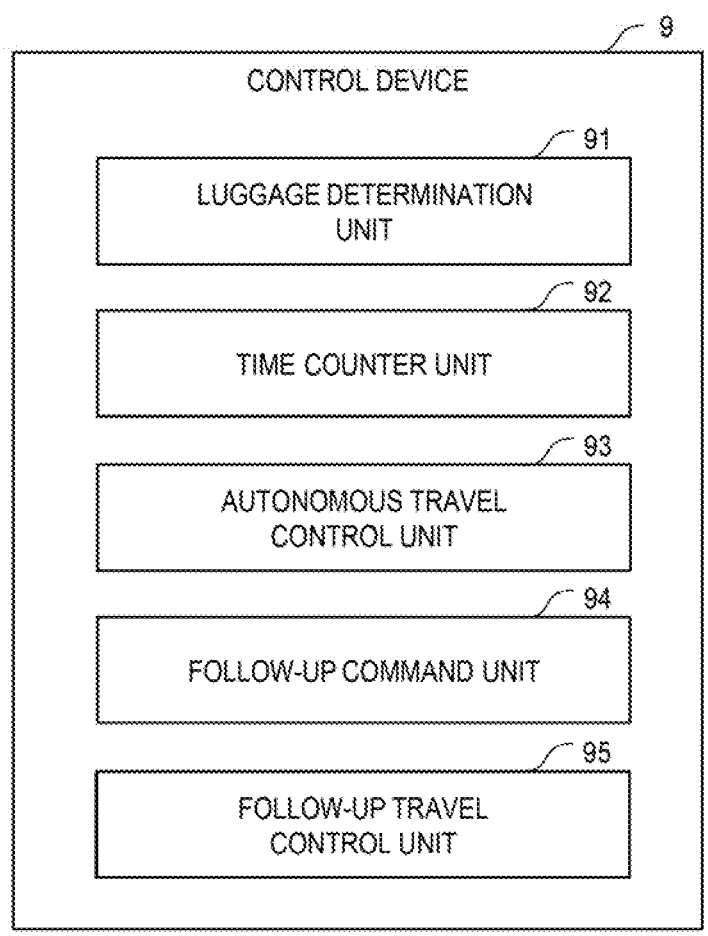
FIG. 3 is a block diagram illustrating each function unit of a control device mounted on the mobile object according to the first embodiment of the present disclosure.

As shown in FIG. 3, the control device 9 includes a luggage determination unit 91, a time counter unit 92, an autonomous travel control unit 93, a follow-up command unit 94, and a follow-up travel control unit 95.

The luggage determination unit 91 functions to determine whether or not luggage is left in the mobile object 1. The luggage determination unit 91 in the present embodiment determines whether or not luggage is left in the luggage compartment unit of the mobile object 1 based on the image information acquired by the camera 13. The determination as to whether luggage is left or not may be made by a method other than image processing. For example, a luggage determination unit that determines whether the luggage is left or not based on the weight of the mobile object 1 may be employed.

The time counter unit 92 functions to determine, in a case where the luggage determination unit 91 determines that no luggage is left in the mobile object 1, whether or not such a state continues for a predetermined period of time. The length of the predetermined period of time used for the determination by the time counter unit 92 can be appropriately tailored depending on the situation. For example, the predetermined period of time can be set to be relatively short in a situation where the closed area is relatively crowded. The crowded status of the closed area can be estimated according to, for example, usage frequency of the mobile object 1.

The autonomous travel control unit 93 functions to generate a control signal, thereby controlling the wheel drive units 6, to move the mobile object 1 to the first location when the time counter unit 92 determines that a state in which no luggage is left in the mobile object 1 continues for the predetermined period of time.

The follow-up command unit 94 functions to generate a follow-up command signal that is transmitted to the other mobile object when the autonomous travel control unit 93 moves the mobile object 1 to the first location. The other mobile object may be, for example, an inverted mobile object configured the same as the mobile object 1.

The follow-up travel control unit 95 functions to generate a control signal, thereby driving and controlling the wheel drive units 6, for allowing the mobile object 1 to follow the other mobile object when receiving a follow-up command signal transmitted from the other mobile object.

Figure 4:
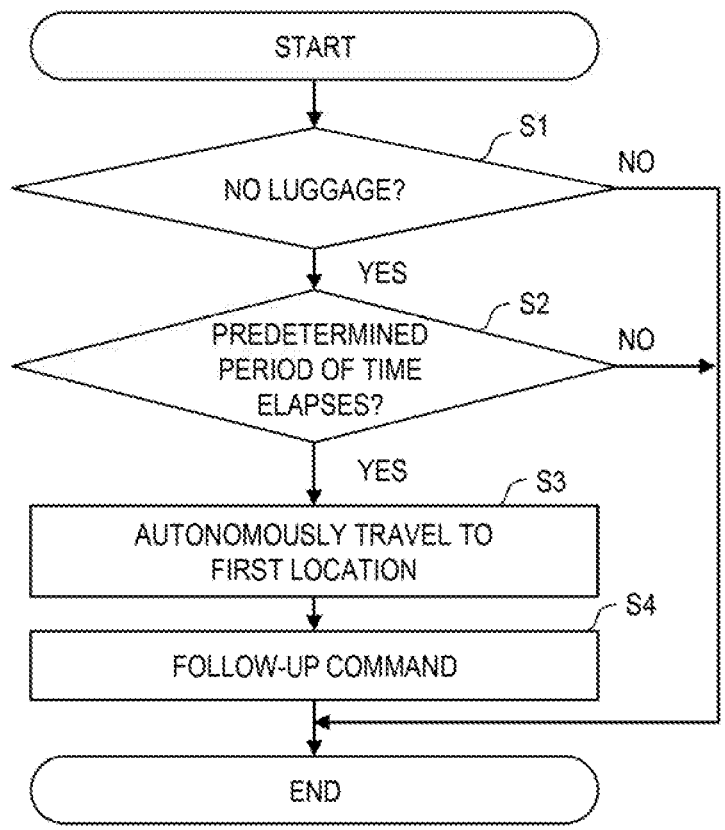
FIG. 4 is a flowchart illustrating a control method for the mobile object according to the first embodiment of the present disclosure.

A control method of the mobile object 1 according to the present embodiment will be described hereinbelow referring to a flowchart of FIG. 4.

First, the control device 9 of the mobile object 1 determines whether or not luggage is left in the luggage compartment unit of the mobile object 1 based on the image information acquired by the camera 13 (luggage determination step: S1). In a case where it is determined that luggage is left in the luggage compartment unit of the mobile object 1 in the luggage determination step S1, the control device 9 determines that the user has not dropped off the mobile object 1 and terminates the control. Meanwhile, in a case where it is determined that no luggage is left in the luggage compartment unit of the mobile object 1 in the luggage determination step S1, the control device 9 determines whether or not such a state has continued for a predetermined period of time (time counting step: S2).

In a case where it is determined that a state in which no luggage is left in the luggage compartment unit of the mobile object 1 has not continued for the predetermined period of time in the time counting step S2 (that is, the luggage is loaded again before the predetermined period of time has elapsed), the control device 9 determines that the user has not dropped off the mobile object 1 and terminates the control. Meanwhile, in a case where it is determined that the state in which no luggage is left in the luggage compartment unit of the mobile object 1 continues for the predetermined period of time in the time counting step S2, the control device 9 determines that the user has dropped off the mobile object 1, generates a specific control signal, and controls the wheel drive units 6 to move the mobile object 1 to the first location (autonomous travel step: S3).

The control device 9 generates a specific follow-up command signal simultaneously with the autonomous travel step S3, and transmits the follow-up command signal to the other mobile object (for example, an inverted mobile object configured the same as the mobile object 1) via the communication device 11 (follow-up command step: S4). A control device of the other mobile object, that receives the follow-up command signal from the mobile object 1, generates a specific control signal for allowing the other mobile object to follow the mobile object 1, thereby driving and controlling wheel drive units of the other mobile object.

The control device 9, according to the embodiment stated above, can determine that the user has dropped off the vehicle in a case in which the mobile object, which allows the user U to drop off the vehicle (that is, the user U getting on at the first location can get off at the second location which is different from the first location) within the predetermined closed space, remains in a state, for a predetermined period of time, in which no luggage is left in the mobile object, thereby controlling the mobile object 1 to move to the first location. In other words, the mobile object 1 incorporating the control device 9, according to the present embodiment, can autonomously return to a platform (first location) by determining whether or not the user has dropped off the vehicle based on whether or not luggage is left in the vehicle. Therefore, it is possible to promote the use of the mobile object 1 within the closed space. Furthermore, in the present embodiment, when the user U drops off the mobile object 1, it is possible to return the mobile object 1 to the specific location (first location) where the user U needs to move via the mobile object 1. Therefore, it is possible to prevent the mobile object 1 from being left at a location where the user U does not need to move via the mobile object 1, and to further promote the use of the mobile object 1.

Furthermore, the control device 9, according to the embodiment stated above, can transmit the follow-up command signal to the other mobile object (for example, an inverted mobile object configured the same as the mobile object 1), which a user has dropped off, when the dropped-off mobile object 1, is moved to the platform (first location). Moreover, the control device 9 can control the mobile object 1 to follow the other mobile object when receiving the follow-up command signal transmitted from the other mobile object. Therefore, it is possible to move several mobile objects (by, for example, linking together) together to the platform.

Second Embodiment

A mobile object (compact vehicle) 100 according to a second embodiment of the present disclosure will be described referring to FIGS. 5 to 8. Moreover, the mobile object 1 according to the first embodiment and the mobile object 100 according to the present embodiment can be used together.

Similar to the first embodiment, the mobile object 100 according to the present embodiment is capable of autonomously traveling within the predetermined closed area, and allows the user U (refer to FIG. 5) to get on at the first location within the predetermined closed area and to get off at the second location which is different from the first location. The closed area, the first location and the second location may be the same as those in the first embodiment.

Figure 5:
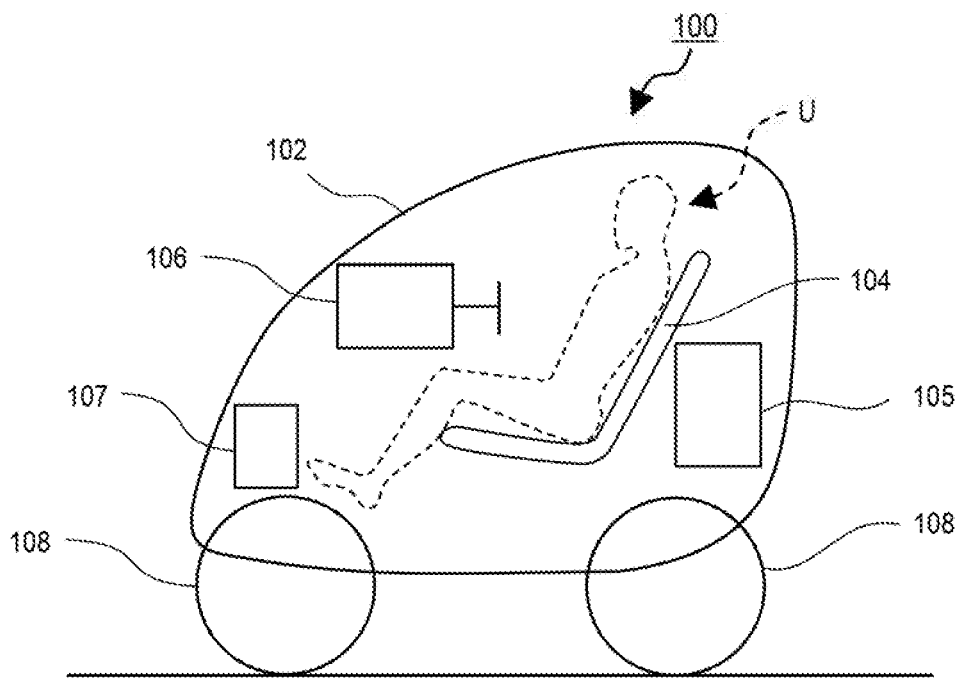
FIG. 5 is a perspective view illustrating an appearance of a mobile object according to a second embodiment of the present disclosure.

The mobile object 100 includes a vehicle main body 102 as shown in FIG. 5. A seat unit 104 including a seat on which a driver sits and a seat on which the other occupant sits is attached to the vehicle main body 102 (hereinafter, the driver and the other occupant of the mobile object 100 are collectively referred to as "user U"). Above the seat of the vehicle main body 102, a roof unit used to protect the user U from the sun and rain is provided. The seat unit 104 may be provided with a seat reclining device for tilting the seat, and a roof opening and closing mechanism for accommodating the roof unit in the vehicle main body 102. A luggage compai linent unit 105 including a luggage compartment for storing the luggage of the user U is provided behind the seat of the vehicle main body 2. Furthermore, the vehicle main body 102 is provided with an air conditioning unit 107 that can supply cold and warm air to the user U. The mobile object 100 further includes an operation unit 106 for operating each unit of the mobile object 100. Furthermore, wheels 108 used for moving are attached to the vehicle main body 102. The mobile object 100, according to the present embodiment, is a two-seater compact vehicle, and for example, two wheels 108 are attached to a front side and one wheel 108 attached to a rear side. The mobile object 100 is configured to be moved as driven by the user U, but also to autonomously travel by switching to an autonomous driving mode.

Figure 6:
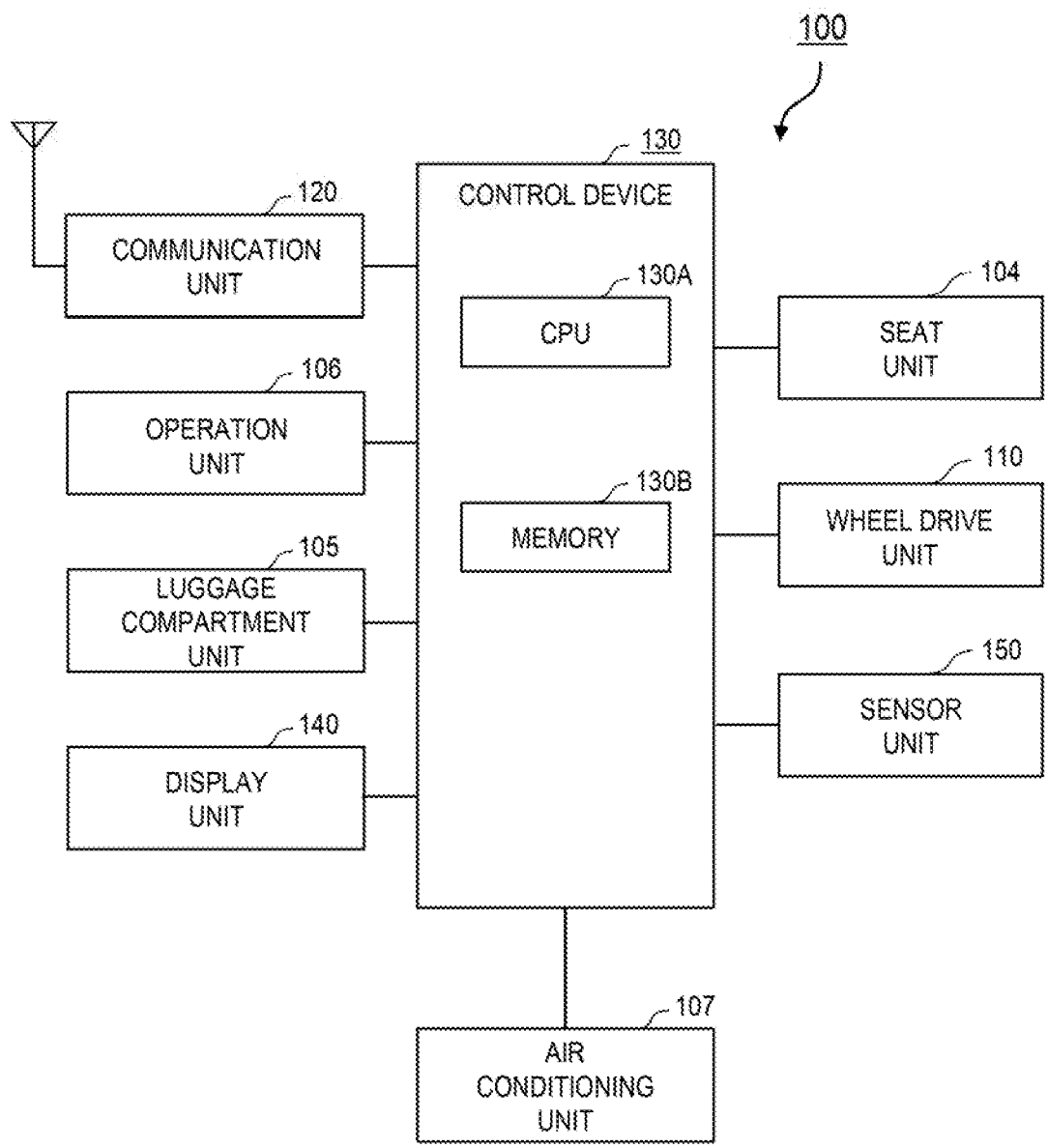
FIG. 6 is a block diagram illustrating a functional configuration of the mobile object according to the second embodiment of the present disclosure.

The mobile object 100, according to the present embodiment, includes, as shown in FIG. 6, a wheel drive unit 110 that drives each wheel 108, a communication unit 120 that enables communication with an external device, a control device 130 that controls each unit of the mobile object 100, a display unit 140 that displays various notifications to the user U, and a sensor unit 150 that is provided with various sensors and outputs information acquired from those sensors to the control device 130.

The wheel drive unit 110 includes an actuator such as, for example, an electric motor and a brake, which are built in the vehicle main body 102, and can drive the wheels 108 and the actuator such as the brake in accordance with a control signal generated by the control device 130 based on a steering operation by the user using the operation unit 106 or a sensor signal transmitted from the sensor unit 150.

The seat unit 104 can drive the seat reclining device, the roof opening and closing mechanism, and the like, based on a control signal received from the control device 130. The luggage compartment unit 105 includes a luggage compartment for accommodating luggage of the occupant and a door attached to the luggage compartment, and can lock or unlock the luggage compartment door based on a control signal received from the control device 130.

The control device 130 (electronic control unit) includes a CPU 130A and a memory 130B, generates a control signal for driving an actuator of each unit of the mobile object 100, and outputs the control signal to each unit. The CPU 130A is provided with one or more processors, executes various computing processes according to instructions included in various computer programs stored in the memory 130B, and controls each of the units. The memory 130B includes, for example, a computer program for executing various computing processes, a computer program for executing computing processes to control the wheel drive unit 110 based on the operation unit 106, and a computer program for executing a computing process to autonomously control the wheel drive unit 110 based on information such as the sensor signal acquired from the communication unit 120 and the sensor unit 150 during autonomous driving. Furthermore, map data is recorded in the memory 130B.

The operation unit 106 includes a steering wheel for the user U to control the moving direction of the mobile object 100, and an accelerator pedal and a brake pedal, which are used for operating the electric motor and the brake mounted on the wheel drive unit 110. The operation unit 106 also includes switches for the user U to drive the seat reclining device, the roof opening and closing mechanism, and the air conditioning unit 107. The operation unit 106 may be configured by a touchscreen that the user can operate or, alternatively, a microphone for recognizing a driver's voice and voice recognition processing software for recognizing several languages, so that the mobile object 100 can be operated by a press operation of the user U on the touchscreen or by a voice of the user U.

The sensor unit 150 includes various sensors for measuring, for example, the environment around the mobile object 100, and outputs, to the control device 130, each piece of information required for controlling the mobile object 100 by the control device 130. The sensor may include a plurality of cameras for capturing the front and rear sides of the mobile object 100, a LIDAR ranging system including a millimeter waver radar for avoiding collision with a pedestrian, an infrared camera, and the like. The sensor unit 150 may include a semiconductor IC for image processing that enables image recognition and the like, to recognize obstacles such as pedestrians and signs installed in the closed area, from an image captured by a camera or the like, and output them to the control device 130. Alternatively, current location may be estimated from a location detection marker, installed on a road surface or the like in the closed area, and surrounding images, and location information may be output to the control device 130. Furthermore, a magnetic sensor for detecting a magnetic marker embedded in the road surface on which the mobile object 100 moves may be provided, and the location information and other information (for example, information indicating a stop position and information indicating a location that is not travelable) may be output to the control device 130. The control device 130 may output a control signal for controlling the wheel drive unit 110 so that, for example, the mobile object 1 stops at a position where the mobile object 1 should be stopped and does not move to a location that cannot be traveled in, based on the sensor signal received from the sensor unit 150, regardless of the operation by the user U. Accordingly, it is possible to provide a mobile object 100 which cannot travel outside the area where traveling is permitted. Moreover, the sensor unit 150 includes a rotary encoder or the like for detecting, for example, a rotational speed of the wheel 108, and outputs speed information to the control device 130. The mobile object 100 may be configured to output, from the control device 130, a control signal for controlling the accelerator and the brake so as not to exceed a predetermined speed regardless of the operation by the user U.

Furthermore, the sensor unit 150 in the present embodiment includes a luggage sensor (image sensor or weight sensor) for detecting the luggage loaded in the luggage compartment unit 105, and thus can detect whether or not the luggage is left in the luggage compartment unit 105. The detection result by the luggage sensor is output to the control device 130 and is used for the determination as to whether or not the user has dropped off the vehicle (described later).

The communication unit 120 includes communication devices such as an antenna and a mobile application processor for transmitting and receiving information to and from an external device. The communication unit 120 also includes communication devices, such as a GPS, for acquiring and outputting the location information to the control device 130. The display unit 140 includes a display device such as a liquid crystal display for displaying notifications to the user U. The air conditioning unit 107 is operated based on an operation of the operation unit 106 by the user U, and includes an air conditioner that blows cool or warm air below the feet of the user U.

Each functional unit of the control device 130 provided in the mobile object 100, according to the present embodiment, will be described hereinbelow referring to FIG. 7.

Figure 7:
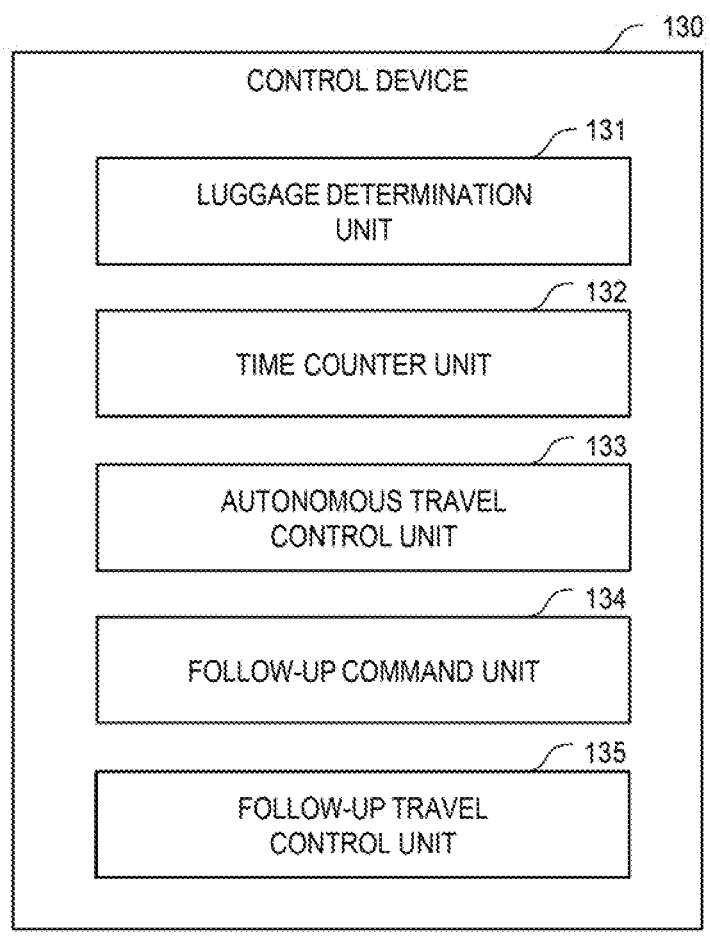
FIG. 7 is a block diagram illustrating each function unit of a control device mounted on the mobile object according to the second embodiment of the present disclosure.

As shown in FIG. 7, the control device 130 includes a luggage determination unit 131, a time counter unit 132, an autonomous travel control unit 133, a follow-up command unit 134, and a follow-up travel control unit 135.

The luggage determination unit 131 functions to determine whether or not luggage is left in the mobile object 100. The luggage determination unit 131 in the present embodiment determines whether or not luggage is left in the luggage compartment unit 105 of the mobile object 100 based on the detection results by the luggage sensor of the sensor unit 150.

The time counter unit 132 functions to determine, in a case where the luggage determination unit 131 determines that no luggage is left in the mobile object 100, whether or not such a state continues for a predetermined period of time.

The autonomous travel control unit 133 functions to generate a control signal, thereby controlling the wheel drive unit 110, to move the mobile object 100 to the first location when the time counter unit 132 determines that the state in which no luggage is left in the mobile object 100 continues for the predetermined period of time.

The follow-up command unit 134 functions to generate a follow-up command signal that is transmitted to the other mobile object when the autonomous travel control unit 133 moves the mobile object 100 to the first location. The other mobile object may be, for example, a compact vehicle having the same configuration as that of the mobile object 100.

The follow-up travel control unit 135 functions to generate a control signal for allowing the mobile object 100 to follow the other mobile object, when receiving a follow-up command signal transmitted from the other mobile object, thereby driving and controlling the wheel drive unit 110.

Figure 8:
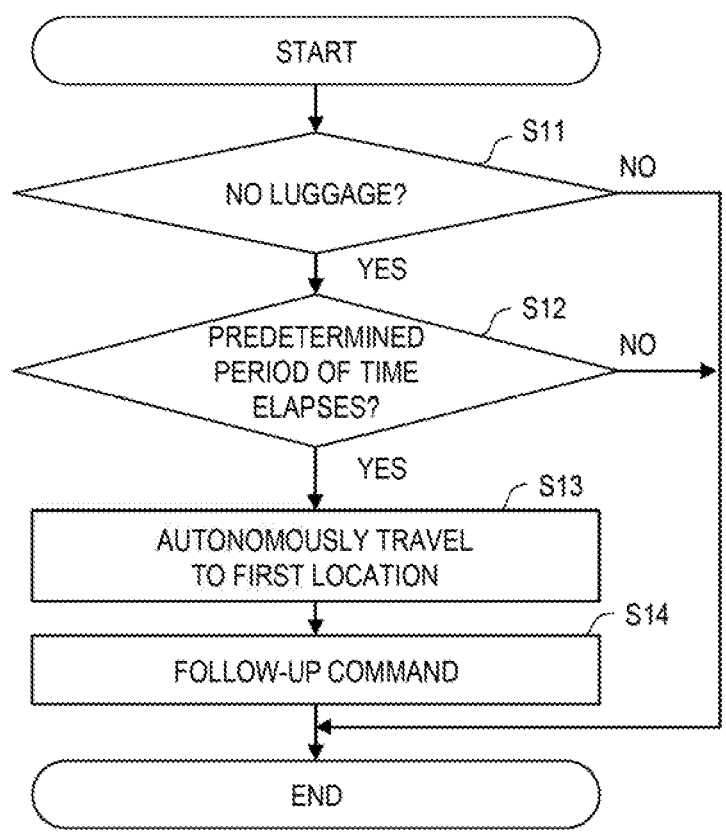
FIG. 8 is a flowchart illustrating a control method for the mobile object according to the second embodiment of the present disclosure.

A control method of the mobile object 100 according to the present embodiment will be described hereinbelow referring to a flowchart of FIG. 8.

First, the control device 130 of the mobile object 100 determines whether or not luggage is left in the luggage compartment unit 105 of the mobile object 100, based on the detection results by the luggage sensor of the sensor unit 150 (luggage determination step: S11). In a case in which it is determined that luggage is left in the luggage compartment unit 105 of the mobile object 100, in the luggage determination step S11, the control device 130 determines that the user does not drop off the mobile object 100 and terminates the control. Meanwhile, in a case where it is determined that no luggage is left in the luggage compartment unit 105 of the mobile object 100, in the luggage determination step S11, the control device 130 determines whether or not such a state continues for a predetermined period of time (time counting step: S12).

In a case where it is determined that a state in which no luggage is left in the luggage compartment unit 105 of the mobile object 100 has not continued for the predetermined period of time in the time counting step S12 (that is, luggage is loaded again before the predetermined period of time has elapsed), the control device 130 determines that the user does not drop off the mobile object 100 and terminates the control. Meanwhile, in a case where it is determined that the state in which no luggage is left in the luggage compartment unit 105 of the mobile object 100 continues for the predetermined period of time in the time counting step S12, the control device 130 determines that the user has dropped off the mobile object 100, generates a specific control signal, and controls the wheel drive unit 110 to move the mobile object 100 to the first location (autonomous travel step: S13).

The control device 130 generates a specific follow-up command signal simultaneously with the autonomous travel step S13, and transmits the follow-up command signal to the other mobile object (for example, the compact vehicle having the same configuration as that of the mobile object 100), via the communication unit 120 (follow-up command step: S14). A control device of the other mobile object, that receives the follow-up command signal from the mobile object 100, generates a specific control signal for allowing the other mobile object to follow the mobile object 100, thereby driving and controlling the wheel drive units of the other mobile object.

The control device 130, according to the embodiment stated above, can determine that the user has dropped off the vehicle in a case in which a state in which no luggage is left in the mobile object 100, which allows the user U to drop off the vehicle (that is, the user U getting on at the first location can get off at the second location which is different from the first location) within the predetermined closed space, continues for the predetermined period of time, thereby controlling the mobile object 100 to move to the first location. In other words, the mobile object 100, incorporating the control device 130 according to the present embodiment, can autonomously return to a platform (first location) by determining whether or not the user has dropped off the vehicle based on whether or not luggage is left in the vehicle. Therefore, it is possible to promote the use of the mobile object 100 within the closed space.

Furthermore, the control device 130, according to the embodiment stated above, can transmit the follow-up command signal to the other mobile object (for example, the compact vehicle configured the same as the mobile object 100), which a user has also dropped off when the dropped-off mobile object 100 is moved to the platform (first location). Moreover, the control device 130 can control the mobile object 100 to follow the other mobile object when receiving the follow-up command signal transmitted from the other mobile object. Therefore, it is possible to move several mobile objects (by, for example, linking together) together to the platform.

In each of the embodiments stated above, the inverted mobile object (FIG. 1) and the compact vehicle (FIG. 5) are shown as examples of the mobile object, but the mobile object is not limited to those examples as long as the mobile object has a configuration that can travel together with the user and the luggage. For example, a small robot or the like can be used as the mobile object.

The present disclosure is not limited to the embodiments stated above, and those obtained by appropriately modifying the design by those skilled in the art are also included in the scope of the present disclosure as long as the features of the present disclosure are included. In other words, each element provided in each embodiment and its arrangement, material, condition, shape, size, and the like are not limited to those illustrated, and can be appropriately altered or modified. Moreover, each element with which each said embodiment is provided can be combined to the extent that it is technically allowable, and the combinations thereof are also included in the scope of the present disclosure as long as the features of the present disclosure are included.

What is claimed is:

1. A mobile object configured to autonomously travel within a park, the mobile object comprising:
a control device configured to:
control the mobile object to allow a user to get on the mobile object at a first location within the park, and to get off at a second location different from the first location,
determine whether the mobile object is in a no luggage state, the no luggage state being a state in which no luggage is left in the mobile object,
determine, based upon the determination that the mobile object is in the no luggage state, whether or not the no luggage state has continued for a predetermined period of time,
based upon the determination that the no luggage state has not continued for the predetermined period of time, determine that the user has not gotten off the mobile object, and
based upon the determination that the no luggage state has continued for the predetermined period of time, control the mobile object to autonomously return to the first location,
wherein the predetermined period of time is based on a frequency of usage of the mobile object.

2. The mobile object according to claim 1, wherein the first location is a specific location where the user needs to move by the mobile object.

3. A control device that controls a mobile object configured to travel within a park, the mobile object allowing a user to get on the mobile object at a first location within the park, and to get off at a second location different from the first location,
wherein the control device is configured to:
   determine whether the mobile object is in a no luggage state, the no luggage state being a state in which no luggage is left in the mobile object,
   determine, based upon the determination that the mobile object is in the no luggage state, whether or not the no luggage state has continued for a predetermined period of time,
   based upon the determination that the no luggage state has not continued for the predetermined period of time, determine that the user has not gotten off the mobile object, and
   based upon the determination that the no luggage state has continued for the predetermined period of time, control the mobile object such that the mobile object returns to the first location,
wherein the predetermined period of time is based on a frequency of usage of the mobile object.

4. The control device according to claim 3, wherein the control device is configured to generate a follow-up command signal for causing another mobile object to follow the mobile object when the mobile object moves to the first location.

5. The control device according to claim 3, wherein the control device is configured to, when receiving a follow-up command signal for causing the mobile object to follow another mobile object, control the mobile object such that the mobile object follows the other mobile object.

6. A control method of controlling a mobile object configured to travel within a park, the mobile object allowing a user to get on the mobile object at a first location within the park, and to get off at a second location different from the first location, the control method comprising:
   determining whether the mobile object is in a no luggage state, the no luggage state being a state in which no luggage is left in the mobile object,
   determining, based upon the determination that the mobile object is in the no luggage state, whether or not the no luggage state has continued for a predetermined period of time,
   based upon the determination that the no luggage state has not continued for the predetermined period of time, determining that the user has not gotten off the mobile object, and
   based upon the determination that the no luggage state has continued for the predetermined period of time, controlling the mobile object such that the mobile object returns to the first location,
wherein the predetermined period of time is based on a frequency of usage of the mobile object.

7. A non-transitory computer-readable storage medium storing therein a computer program that controls a mobile object configured to travel within a park, the mobile object allowing a user to get on the mobile object at a first location within the park, and to get off at a second location different from the first location, the computer program, when executed by at least one processor, causes the at least one processor to:
   determine whether the mobile object is in a no luggage state, the no luggage state being a state in which no luggage is left in the mobile object,
   determine, based upon the determination that the mobile object is in the no luggage state, whether or not the no luggage state has continued for a predetermined period of time,
   based upon the determination that the no luggage state has not continued for the predetermined period of time, determine that the user has not gotten off the mobile object, and
   based upon the determination that the no luggage state has continued for the predetermined period of time, control the mobile object such that the mobile object returns to the first location,
wherein the predetermined period of time is based on a frequency of usage of the mobile object.

* * * * *